INVENTORS
JOHN C. ZIEGLER
LUCIEN R. BEAUREGARD
HARRY LANGER
BY Herbert L. Davis
ATTORNEY INVENTORS
JOHN C. ZIEGLER
LUCIEN R. BEAUREGARD
HARRY LANGER
BY Herbert L. Davis
ATTORNEY INVENTORS
JOHN C. ZIEGLER
LUCIEN R. BEAUREGARD
HARRY LANGER
BY Herbert L. Davis
ATTORNEY

United States Patent Office 3,057,585
Patented Oct. 9, 1962

---

3,057,585
CONTROL STICK
John C. Ziegler, Maywood, and Lucien R. Beauregard, Rutherford, N.J., and Harry Langer, New York, N.Y., assignors to The Bendix Corporation, a corporation of Delaware
Filed May 29, 1959, Ser. No. 816,735
2 Claims. (Cl. 244—83)

The invention relates to improvements in an aircraft control stick and more particularly to improvements in a control stick of a type such as disclosed and claimed in U.S. application Serial No. 840,987 filed September 18, 1959 for reissue of U. S. Patent No. 2,861,756 granted November 25, 1958 to Robert E. Feucht, John Jarvis and John C. Ziegler and assigned to Bendix Aviation Corporation and to a manual control stick particularly adapted for use in a system for modifying or overcoming an aircraft automatic pilot control of a type disclosed and claimed in the application for reissue of the aforesaid patent.

In the control stick disclosed in the aforenoted patent, there are provided deflection sensing synchros suspended exteriorly for the control stick and through an interconnecting linkage arrangement effective to sense a deflection of the control stick in a fore and aft or sideward direction so as to provide electrical signals for resetting the automatic pilot in a pitch or roll sense dependent upon the direction and magnitude of the force applied to the control stick.

An object of the present invention is to provide a simplified and improved control stick assembly in which the pitch and roll control elements are mounted interiorly of a control stick column assembly in such a manner as to avoid any external interconnecting linkage elements and whereby no discernible cross coupling is effected between the pitch and roll channel control signals effected by fore and aft or sideward movement of the control stick.

Another object of the invention is to provide an improved control stick in which the force applied purely in a fore and aft direction or pitch sense results only in a signal in a pitch sense while a force applied to a sideward direction or roll sense causes a similar result by effecting only a signal in a roll sense; and the arrangement is such that forces applied to the control stick in both pitch and roll senses will produce signals that are proportional to the commands in the aforenoted directions.

Another object of the invention is to provide an improved control stick in which a resilient column of the control stick is so designed and arranged that its deflection under load is known and maintained accurately and there is mounted interiorly of the column section highly sensitive, unidirectional, electrical pickup means. The electrical pickup means are carried by an inner member extending longitudinally within the resilient column. There are further provided armature means carried by the column and arranged in cooperative relation with the pickup means so that upon deflection of the resilient column relative to the inner extending longitudinal member said armature means cooperating with the electrical pickup means effects output signals varying in sense and magnitude with the direction and magnitude of the deflective force applied to the control stick within the range of deflective movement of the resilient column relative to the inner extending longitudinal member.

Another object of the invention is to provide an improved control stick of the aforenoted type in which the resilient column is suitably slotted in a fore and aft plane and somewhat differently slotted in a sideward plane so that a deflection of the control stick in a fore or aft direction by the pilot requires a distinctly different force than the force required to effect a deflection of the control stick in a sideward direction and such that the control of the plane in a pitch or roll sense is accompanied by a control stick feel which approximates that sensed by the pilot when flying under manual control. Moreover, in the aforenoted arrangement there is no discernible cross coupling between the roll and pitch channels and a force applied purely in a pitch sense will result only in a pitch signal and a force applied purely in a roll sense will result only in a roll signal while a force commanding both pitch and roll will produce signals that are proportional to the commands in each channel.

These and other objects and features of the invention are pointed out in the following description in terms of the embodiment thereof which is shown in the accompanying drawings. It is to be understood, however, that the drawings are for the purpose of illustration only and are not intended as a definition of the limits of the invention, reference being had to the appended claims for this purpose.

In the drawings wherein like parts are marked alike:

Figure 1:
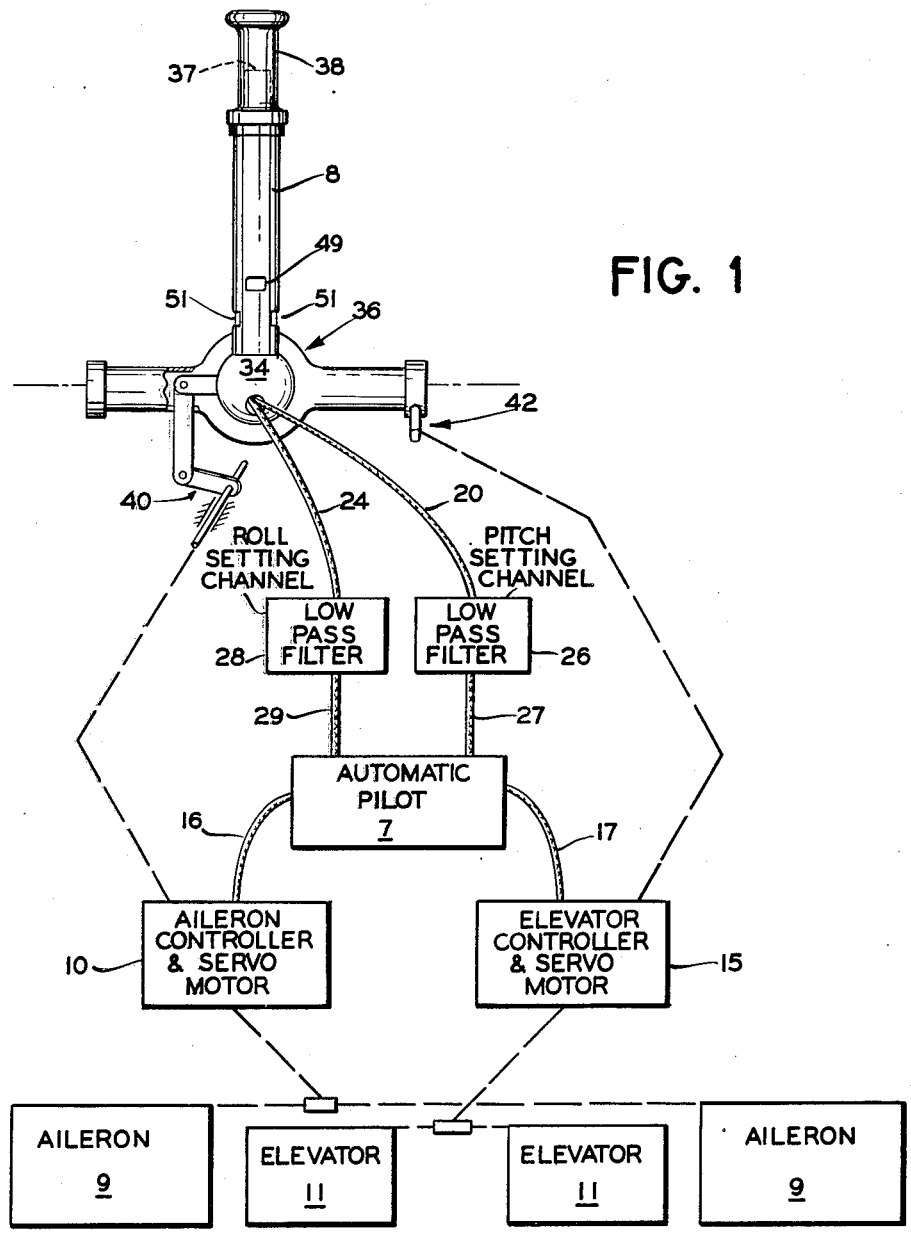
FIGURE 1 illustrates schematically a control stick embodying the present invention and shown in operative relation in a control system in which the invention is designed for use.

Referring to FIGURE 1 there is shown schematically a control system such as disclosed and claimed in the aforenoted U.S. Patent No. 2,861,756 in which the improved control stick of the present invention may be used and in which the control surfaces of an aircraft may be operated automatically by an automatic pilot system denoted generally at 7 or manually controlled by the improved control stick 8 forming the subject matter of the invention. The manual control stick 8 is mounted universally so that lateral or sideward displacements thereof effectively control ailerons 9 through operation of a suitable controller and servomotor 10, as indicated diagrammatically in the drawing of FIGURE 1, while fore and aft displacements of the control column 8 in turn control elevators 11 through operation of a suitable controller and servomotor designated by the numeral 15.

Similarly as disclosed in the aforenoted U.S. Patent No. 2,861,756, pitch and roll sensing devices operating in the automatic pilot 7 apply electrical signals through conduits 16 and 17 to motors 10 and 15 so as to effect operation of the elevators 11 and ailerons 9 to provide the desired controlling action.

Upon an application to the manual control 8 of a force in excess of a predetermined value the deflective movement of a resilient column thereof is effective to cooperate with a member extending longitudinally therein, as explained hereinafter, to impart a force to override the operation of the controllers and servomotors 10 and 15 by the automatic pilot 7 and render the manual control 8 effective to control the operation of the ailerons and elevators 9 and 11 through the controllers and servomotors 10 and 15 which made be of the type shown in FIG. 4 of the aforenoted patent and explained therein.

Improved Control Stick

In accordance with the present invention, improved force translation means mounted interiorly of the control column 8 are electrically included in the signal chain so that by applying to the manual control column 8 a force less than that required to overcome the operation by the automatic pilot 7 of the elevator or aileron servomotors 10 and 15, there is developed a signal proportional to this force and in a sense or electrical phase depending upon the direction of the application of force. The developed signal is applied through a pitch setting channel conduit 20 or a roll setting channel conduit 24 as the case may be and to either or both of the pair of low pass filters 26 and 28 and through conduits 27 and 29 leading from these filters to the automatic pilot control system 7 to vary the setting of the automatic pilot system, as described in the aforenoted patent. As explained therein, the low pass filters 26 and 28 are provided so that the inertia of the pilot's hand and the spring rate of the control column will not form an oscillating system in varying the setting of the automatic pilot system 7.

Figure 2:
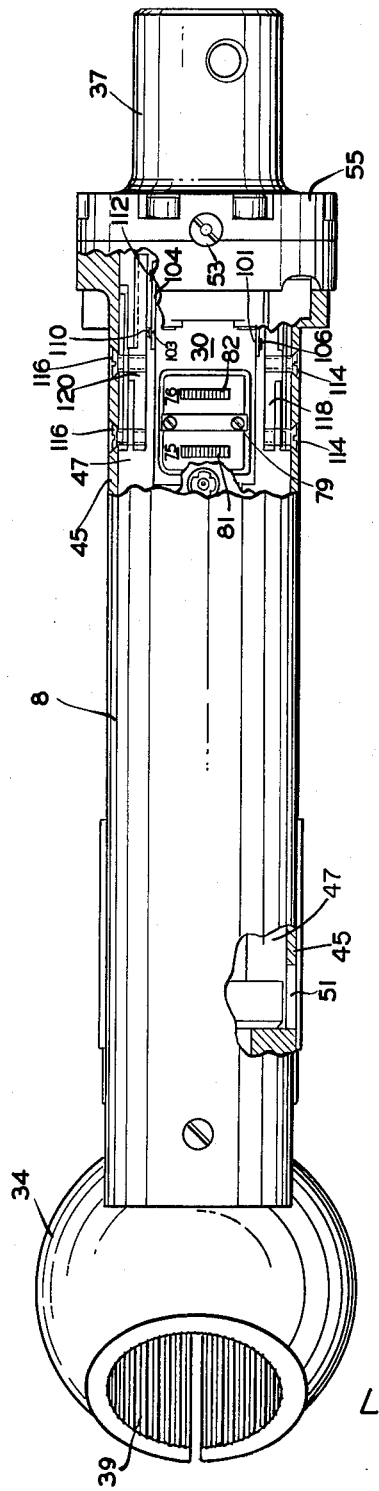
FIGURE 2 is a longitudinal view of the improved control stick with parts broken away to illustrate operative mechanism therein.
Figure 3:
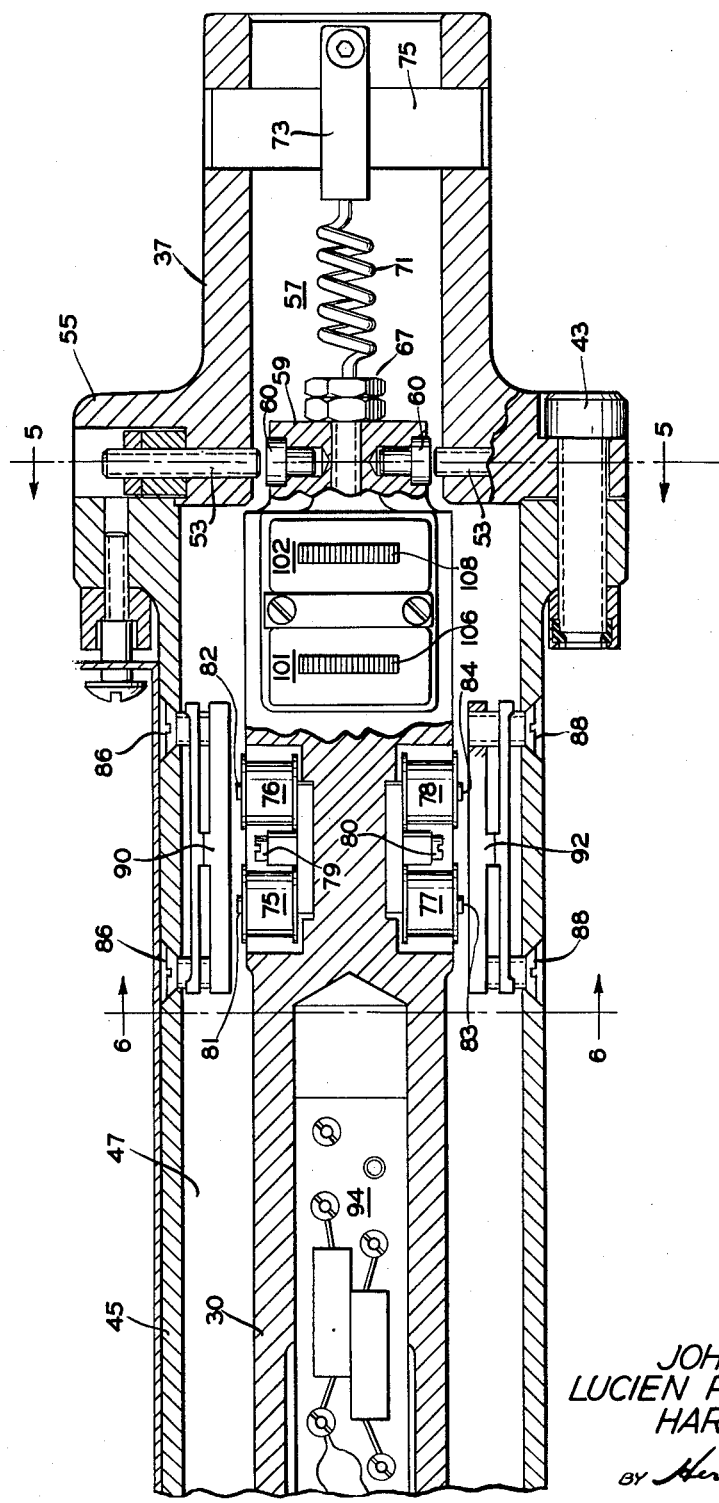
FIGURE 3 is an enlarged longitudinal sectional view of the upper half of the control stick of FIGURE 2.
Figure 4:
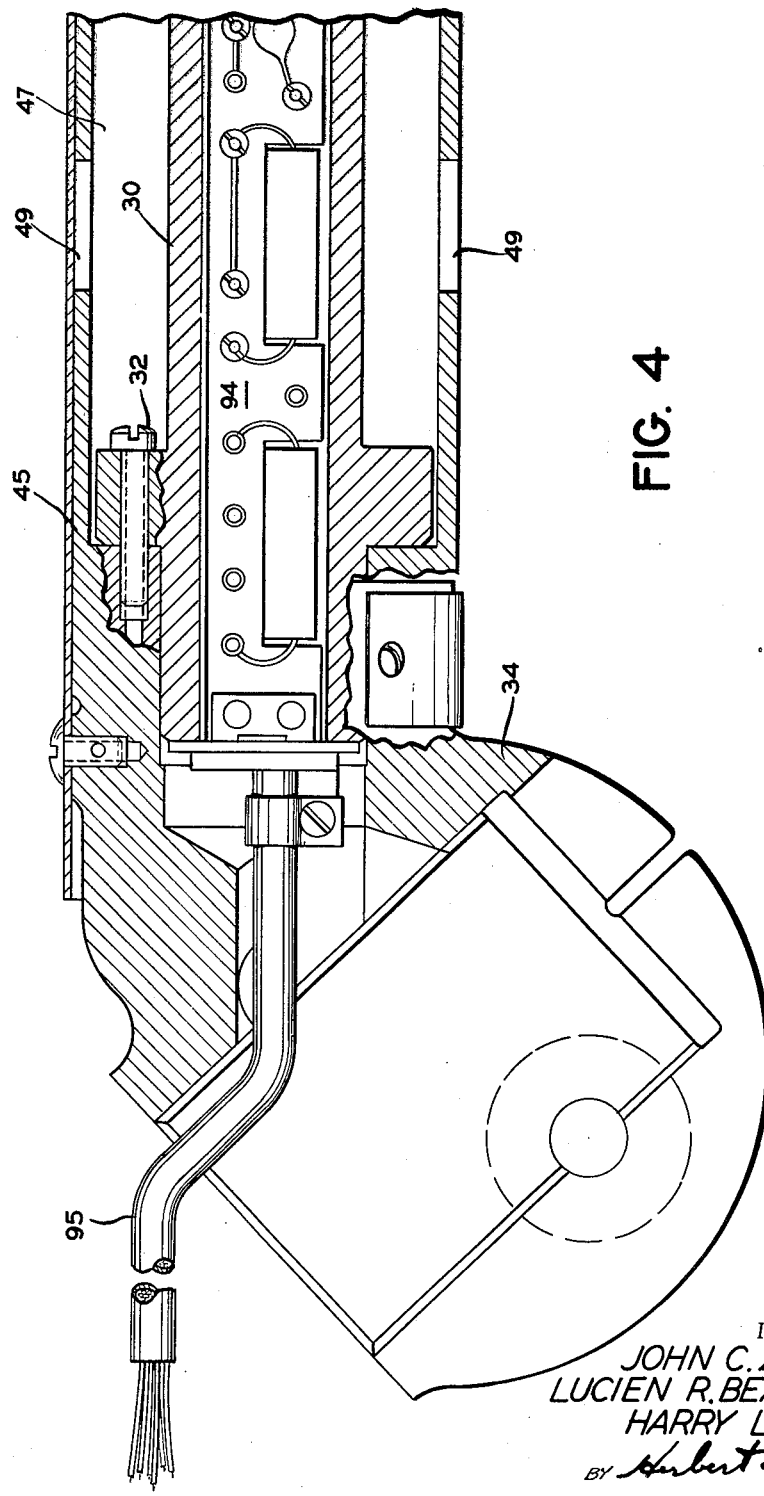
FIGURE 4 is an enlarged longitudinal view of the lower half of the control stick of FIGURE 3.

The improved control column 8 forming the subject matter of the present invention is shown in detail in FIGURES 2, 3 and 4 and includes therein a longitudinally extending member 30 rigidly secured at its lower end, as shown in FIGURE 4, by bolts 32 to a universally movable ball-like joint member 34 mounted to a control pedestal 36, shown in FIGURE 1, by conventional means (not shown) so that upon appropriate forces being exerted on a collar 37 by a hand grip 38 at the upper end of the control column 8 and transmitted through improved means, hereinafter described, such forces are applied through the column 8 and the ball-like joint member 34, including operating splines 39, so as to actuate mechanical linkages 40 and 42 to effectively operate, as shown schematically in the drawing of FIGURE 1, the controllers 10 and 15 for the ailerons and elevators 9 and 11.

As best shown in FIGURE 3, the collar 37 is secured by bolts 43 to the upper end of a resilient tubular column 45 which projects from the ball mounting 34 provided at the lower end thereof. As shown in FIGURE 4, the lower end of the column 45 is formed integral with the ball-like joint member 34 so as to provide a one piece assembly which inherently lessens internal hysteresis due to internal friction in the transference of force applied at the hand grip 38 and through the column 45 and member 30 to the universally movable ball-like joint member 34 and thereby provide extreme accuracy in repeatable operation. The member 30 secured at its lower end to the ball-like joint member 34 further extends longitudinally within the resilient tubular column 45 and in spaced relation thereto. As shown in the drawing of FIGURES 2, 3, and 4, there is provided a space 47 between the member 30 and the resilient tubular column 45 and slots 49 in the column 45 in the fore and aft plane of the flexible tubular member 45 so as to permit the member 45 to flex in a fore and aft direction relative to the member 30 upon an appropriate force being applied at the hand grip 38 in a pitch controlling sense. Similarly, as shown in FIGURES 1 and 2, there are provided somewhat different slots 51 in the column 45 located in opposite sides of the resilient tubular column 45 so as to permit the member 45 to flex in a sideward direction relative to the member 30 upon a different force being applied at the hand grip 38 in a roll controlling sense.

The slots 49 and 51 are so arranged in the resilient tubular column 45 that control of the plane in a pitch or roll sense is accompanied by a feel of the control stick 8 which approximates that sensed by the pilot in operating the usual control stick when flying under manual control.

Limiting the flexure of the resilient tubular column 45 relative to the member 30 in a fore and aft direction are adjustable stop bolts 53 screw threadedly engaged in a lower flange portion 55 of the collar 37 and extending radially into a space 57 within the collar 37.

The member 30 projects into the space 57 within the collar 37 and has provided at an upper end portion 59 thereof press fit inserts 60 arranged to operatively contact the ends of one or the other of the stop bolts 53 so as to limit flexure of the resilient tubular column 45 relative to the member 30 in a fore or aft direction.

Figure 5:
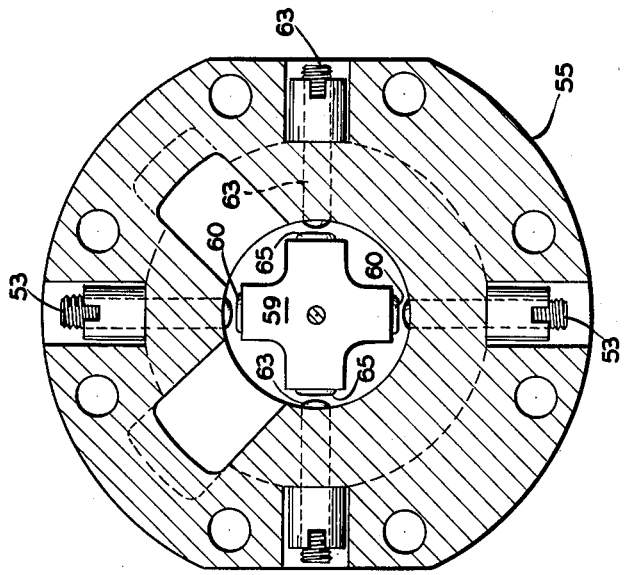
FIGURE 5 is a sectional view of FIGURE 3 taken along the lines 5—5 and looking in the direction of the arrows.
Figure 6:
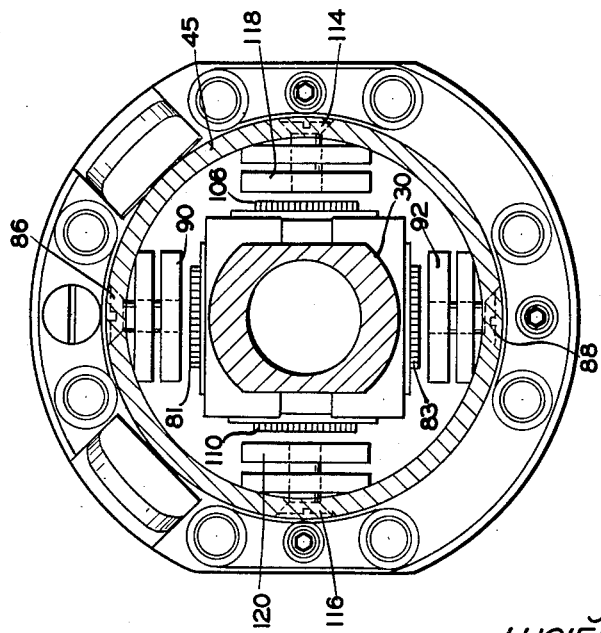
FIGURE 6 is a sectional view of FIGURE 3 taken along the lines 6—6 and looking in the direction of the arrows.

Further, as shown in FIGURE 5, similar stop bolts 63 in the collar 37 cooperate with like press fit inserts 65 in the upper end portion 59 of the member 30 to operatively contact the ends of one or the other of the stop bolts 63 so as to limit flexure of the resilient tubular column 45 relative to the member 30 in a sideward direction. The stop bolts 53 and 63 thereby cooperate to prevent excessive relative movements of the several parts of the signal generators, hereinafter described, in fore and aft and sideward directions.

Further affixed to the upper end portion 59 of the member 30 by a bolt 67 is a spring element 71 fastened at an upper opposite end to a bracket 73 pivotally mounted on a hollow pin 75 positioned in the collar 37 and arranged so as to tend to maintain the member 30 and resilient tubular column 45 in a normal spaced relation one to the other under the tension of the spring 71, as shown in the drawings of FIGURES 2, 3 and 4. The hand grip 38 is attached to the collar 37 by a suitable bolt, not shown, which may pass through the hand grip 38 and hollow pin 75 so as to secure the hand grip 38 to the collar 37.

In order to sense a deflection of the tubular column 45 relative to the member 30 in a fore or aft direction, there are provided variable reluctance pick up coils 75—76 and 77—78 fastened in the member 30 at opposite sides thereof by bolts 79 and 80 respectively.

The coils 75—76 are wound about electromagnetic core elements 81—82 while the coils 77—78 are wound about electromagnetic core elements 83—84. Fastened to the inner surface of the tubular column 45 by bolts 86 and 88 are armatures 90 and 92 of a ferro magnetic material arranged so as to cooperate with the electromagnetic core elements 81—82 and 83—84 to vary the reluctance of the pickup coils 75—76 and 77—78 upon a deflection of the resilient tubular column 45 in a fore or aft direction relative to the member 30.

The coils 75—76 and 77—78 form opposite arms of a normally balanced bridge circuit of a conventional type having suitable biasing resistors and condensers as may be required mounted on a terminal board indicated generally by the numeral 94 and positioned in the member 30, as shown in FIGURE 3.

The aforenoted bridge circuit has an input connected across a suitable source of alternating current, not shown, and an output effective upon an unbalancing of the bridge circuit by the variance in the reluctance of the pickup coils 75—76 and 77—78 to apply a signal of a controlling phase through the conduit 20 of the pitch setting channel of FIGURE 1.

The conduit 20 may be carried by a main conduit 95 leading from the terminal board 94 in the member 30, as shown in FIGURE 4, and may in turn lead to the low pass filter 26 and thereby to the automatic pilot 7 for varying the pitch setting thereof to operate the elevator controller 15, as described in the aforenoted Feucht et al. U.S. Patent No. 2,861,756.

Further in order to sense a deflection of the tubular column 45 relative to the member 30 in a sideward direction, there are provided variable reluctance pickup coils 101—102 and 103—104 fastened in the member 30 at opposite sides thereof by suitable bolts.

The coils 101—102 are wound about electromagnetic core elements 106—108 while the coils 103—104 are wound about electromagnetic core elements 110-112. Fastened to the inner surface of the tubular column 45 by bolts 114 and 116 are armatures 118—120 of a ferro magnetic material arranged so as to cooperate with the electromagnetic core elements 106—108 and 110—112 to vary the reluctance of the pickup coils 101—102 and 103—104 upon a deflection of the resilient tubular column 45 in a sideward direction relative to the member 30 to one side or the other thereof.

The coils 101—102 and 103—104 form opposite arms of a normally balanced bridge circuit of a conventional type having suitable biasing resistors and condensers as may be required mounted on the terminal board 94 and positioned in the member 30, as shown in FIGURE 4.

The last mentioned bridge circuit has an input connected across a suitable source of alternating current, not shown, and an output effective upon an unbalancing of the bridge circuit by the variance in the reluctance of the pickup coils 101—102 and 103—104 to apply a signal of a controlling phase through the conduit 24 of the roll setting channel of FIGURE 1.

The conduit 24 may be carried by the main conduit 95, as shown in FIGURE 4, and in turn lead to the low pass filter 28 and thereby to the automatic pilot 7 for varying the roll setting thereof to operate the aileron controller 10, as described in the aforenoted Feucht et al. U.S. Patent No. 2,861,756.

Upon one of the stop bolts 53 contacting an insert 60 or one of the stop bolts 63 contacting an insert 65 at the limit of permissible movement of the resilient column 45 relative to the member 30 in a fore or aft or sideward direction, as the case may be, a further force applied to the hand grip 38 in the controlling direction will impart a direct movement to the member 30, ball mounting 34 and controlling pedestal 36, shown in FIGURE 1, so as to acutate the mechanical linkages 40 or 42 to effectively control manually the operation of the controllers 10 and 15 for the ailerons 9 and elevators 10.

Thus there is provided an improved control stick of compact assemblage and accurate operation whereby during the operation of the automatic pilot system 7, the human pilot can by exertion of a force exceeding a predetermined amount set by the resilience of the resilient tubular column 45 and the initial adjustment of the stop bolts 53 and 63, overpower the automatic pilot system and control the operation of the aileron and elevator surfaces 9 and 11 manually through the operation of the aileron and elevator controller mechanism 10 and 15, described in the aforenoted Feucht et al. U.S. Patent No. 2,861,756.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A control stick comprising a resilient tubular column, a universally movable ball-like member formed integral with a lower end of said tubular column, a rod extending longitudinally within the tubular column in spaced relation thereto, means affixing a lower end of the rod to the ball-like member at the lower end of the tubular column, said resilient tubular column having therein slot means in a first lateral plane and other slot means in a second plane perpendicular to the first lateral plane, said first and second mentioned slot means being arranged in spaced relation in said tubular column so that deflection of the tubular column in said first plane may be effected by a different force than deflection of the tubular column in said second plane, first stop means for limiting relative movement between the column and rod in said first lateral plane, second stop means for limiting relative movement between the column and rod in said second plane perpendicular to the first lateral plane, said first and second stop means being mounted at an upper end of said column and in cooperative relation with an upper end of said rod, manually operable means mounted at the upper end of the tubular column for exerting a force on said column at said upper end thereof to deflect said column relative to said rod in said first and second planes, electrical signal developing means mounted within said tubular column and between said rod and column to develop electrical signals in response to deflection of said column relative to said rod in said first and second planes, said signals varying in sense and magnitude with said exerted force upon the force applied to said manually operable means being within a predetermined operating range, and said first and second stop means being effective to operatively connect said resilient tubular column to said rod upon the force applied to said manually operable means exceeding said predetermined operating range, and control means operatively positioned by the ball-like member at the lower ends of the tubular column and rod to effect a control function upon the column and rod being operatively connected as aforesaid.

2. A control stick comprising a resilient tubular column, a universally movable ball-like member formed integral with a first end of said tubular column, a rod extending longitudinally within the tubular column in spaced relation thereto, means affixing a first end of the rod to the ball-like member at the first end of the tubular column, said tubular column having slot means therein so arranged that a deflection of the tubular column in a first lateral plane may be effected by a different force than a deflection of the tubular column in a second plane perpendicular to the first lateral plane, manually operable means mounted at a second end of the tubular column for exerting a force on said column at said second end thereof to deflect said column relative to said rod in said first and second planes, electrical signal developing means mounted within said tubular column and between said rod and column to develop electrical signals in response to deflection of said column relative to said rod in said first and second planes, said signals varying in sense and magnitude with said exerted force upon the force applied to said manually operable means being within a predetermined operating range, means to operatively connect said resilient tubular column to said rod upon the force applied to said manually operable means exceeding said predetermined operating range, and control means operatively positioned by the ball-like member at the first ends of the tubular column and rod to effect a control function upon the column and rod being operatively connected by said connecting means as aforesaid.

References Cited in the file of this patent

UNITED STATES PATENTS

| | | |
|---|---|---|
| 2,393,892 | De Ganahl | Jan. 29, 1946 |
| 2,583,828 | Gerstenberger | Jan. 29, 1952 |
| 2,888,635 | Volk | May 26, 1959 |
| 2,895,086 | Pettit | July 14, 1959 |
| 2,934,292 | Visser | Apr. 26, 1960 |